T. F. MARTIN.
METAL STRIP JOINT.
APPLICATION FILED MAR. 22, 1910.

980,311.

Patented Jan. 3, 1911.

Witnesses
Inventor
Thomas F. Martin
his Attorneys

UNITED STATES PATENT OFFICE.

THOMAS F. MARTIN, OF ATLANTA, GEORGIA.

METAL-STRIP JOINT.

980,311. Specification of Letters Patent. Patented Jan. 3, 1911.

Application filed March 22, 1910. Serial No. 551,013.

*To all whom it may concern:*

Be it known that I, THOMAS F. MARTIN, a citizen of the United States, residing at Atlanta, in the county of Fulton and State of Georgia, have invented certain new and useful Improvements in Metal-Strip Joints; and I do hereby declare the following to be a full, clear, and exact description of the invention, such as will enable others skilled in the art to which it appertains to make and use the same.

This invention relates to improvements in means for joining or splicing the ends of metal strips.

The object of the invention is to provide means for efficiently securing the ends of metal strips, without the necessity of welding them together or connecting them by means of rivets or other devices necessitating the perforation or cutting away of the strips.

Considerable loss results from waste or scrap metal strips of various kinds, and particularly the scrap ties or bands used in connection with cotton bales, and for many years there has been a demand for a cheap and efficient means for joining or splicing together these tie scraps in such manner that they retain their full tensile strength in order that they may be fit for re-use as tie bales or any other connections.

One of the objects of this invention is to provide means that will accomplish this end by providing a simple method of joining the ends of metal strips providing a joint of maximum strength at a minimum cost.

While the invention is particularly useful in connection with cotton tie band scraps, it will be understood, of course, that the invention itself is not restricted to this particular use, as it might be equally well employed in securing together the ends of any kind of metal strips for use in baling other compressed substances such as hay, etc., and also for use in splicing together hoop bands for barrels, kegs, tubs, and similar articles.

To more fully understand the invention reference is had to the following description and accompanying drawings disclosing practical embodiments of same, and the particular features of novelty will be more succinctly pointed out in the appended claims.

Figure 1:
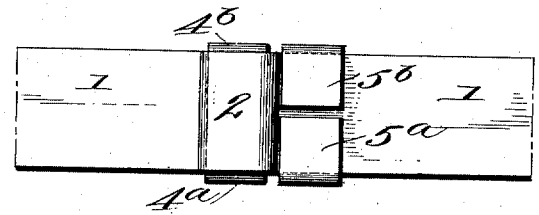
Figure 2:
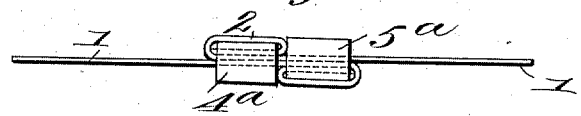
Figure 3:
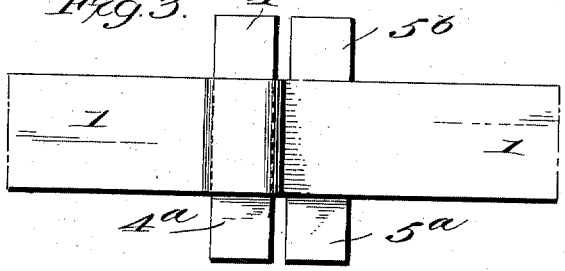
Figure 4:
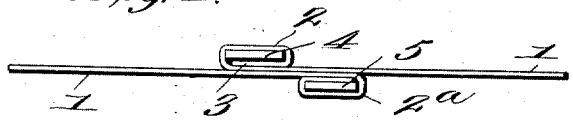
Figure 5:
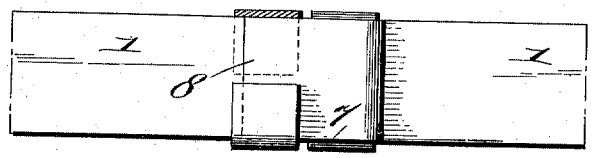

In the drawings, in which like characters designate the same parts in the several views, Figure 1 is a plan view showing two ends of metal strips spliced together in accordance with one form of my invention. Fig. 2 is a view in side elevation of same. Fig. 3 is a plan view showing the positions of the strips with relation to each other before being firmly spliced together. Fig. 4 is an edge view of Fig. 3. Fig. 5 is a plan view showing another form of the invention, the ends being spliced together and one of the lateral clips being shown in section, and Fig. 6 is a perspective view showing the form of prepared metal strip illustrated in Fig. 5.

1 designates the end of a metal strip bent upon itself to form a substantially rectangular shaped loop 2, the end 3 of the metal strip being disposed within the loop formed and resting against the front face of the member 1. Within these loops are disposed the transverse tie members or clips 4 and 5 composed of suitable metal.

In operation the metal strips 1 are placed back to back, as shown in Fig. 4, with the loop portions 2 disposed outwardly immediately adjacent each other. In this position the end $4^a$ of the tie member or clip 4 is bent around one edge and in front of its opposed metal strip 1, and similarly the end $4^b$ is also bent around the opposite edge. So also the ends $5^a$ and $5^b$ of the clip 5 are bent around in the reverse direction to engage the front face, of its opposed metal strip, the ends $4^a$ and $4^b$ being disposed in alinement with the loop $2^a$ and the ends $5^a$ and $5^b$ being disposed in alinement with the loop 2.

Figure 6:

In the construction illustrated in Figs. 5 and 6, the arrangement is substantially the same, with the exception that the end of the metal strip 6 instead of being disposed within the rectangular loop 7 is pressed downwardly, as at 8, and forms a recess or seat for the ends of the tie members or clips when the metal strips are spliced together.

From the foregoing it will be observed that the bent over ends of the clips lying adjacent the loops on their opposed metal strips, the loops act as shoulders or abutments, coöperating with the bent over ends to securely lock the metal members together, and the greater the tensile strain the more securely is the interlock formed between the ends of the metal strips.

From the foregoing it will be seen that I provide a simple, cheap and efficient means for joining together the ends of metal strips, thereby providing means for utilizing scrap tie bands and hoops which have heretofore been assigned to the waste or scrap pile.

It will also be understood from the foregoing that, in order to effect the joint described, there is no particular preparation necessary excepting to turn over the ends of the metal strips upon themselves to form loops over the metal clips or tie members, and this may be done with the simplest of tools or by the use of ordinary machinery.

Having thus described the invention, what claim is:—

The combination of a plurality of metal strips, placed back to back and at their ends provided with transversely opening loop members on their front faces and clips contained within said loop members and projecting laterally thereof, the clip within the loop member of each metal strip being adapted to be bent over and engage the front face of its opposed metal strip and abut against the loop member thereof, substantially as described.

In testimony whereof, I affix my signature, in presence of two witnesses.

THOMAS F. MARTIN.

Witnesses:
EDGAR WATKINS,
W. CARROLL LATIMER.